United States Patent
Day et al.

(10) Patent No.: US 7,133,861 B2
(45) Date of Patent: Nov. 7, 2006

(54) QUERY ACCESS PLAN REBUILDS

(75) Inventors: Paul Reuben Day, Rochester, MN (US); Brian Robert Muras, Rochester, MN (US); Anne Marie Ryg, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/727,420

(22) Filed: Dec. 4, 2003

(65) Prior Publication Data

US 2005/0125409 A1    Jun. 9, 2005

(51) Int. Cl.
G06F 7/00 (2006.01)
G06F 17/00 (2006.01)
G06F 17/30 (2006.01)

(52) U.S. Cl. .............................. 707/2; 707/3; 707/102
(58) Field of Classification Search ................ 707/1–4, 707/6, 10, 100, 102
See application file for complete search history.

(56) References Cited

U.S. PATENT DOCUMENTS

| | | | | |
|---|---|---|---|---|
| 5,778,364 A | * | 7/1998 | Nelson | 707/6 |
| 6,366,901 B1 | * | 4/2002 | Ellis | 707/2 |
| 6,466,931 B1 | * | 10/2002 | Attaluri et al. | 707/2 |
| 6,529,901 B1 | * | 3/2003 | Chaudhuri et al. | 707/3 |
| 6,615,203 B1 | * | 9/2003 | Lin et al. | 707/3 |
| 6,711,560 B1 | * | 3/2004 | Levy et al. | 707/1 |
| 6,732,084 B1 | * | 5/2004 | Kabra et al. | 707/2 |
| 6,738,782 B1 | * | 5/2004 | Agarwal et al. | 707/102 |
| 6,847,978 B1 | * | 1/2005 | Ellis et al. | 707/102 |
| 6,915,290 B1 | * | 7/2005 | Bestgen et al. | 707/2 |
| 6,917,932 B1 | * | 7/2005 | Chang et al. | 707/2 |
| 6,996,556 B1 | * | 2/2006 | Boger et al. | 707/3 |
| 2003/0093408 A1 | * | 5/2003 | Brown et al. | 707/2 |
| 2004/0006561 A1 | * | 1/2004 | Nica | 707/3 |
| 2005/0097078 A1 | * | 5/2005 | Lohman et al. | 707/2 |

OTHER PUBLICATIONS

Jaideep Srivastava and Gary Elsesser disclose (1993), Optimizing Multi-Join Queries in Parallel Relational Databases, pp. 84-92.*
Matthias Jarke and Jurgen Koch disclose (1984), Query Optimization in Database Systems, pp. 111-152.*
R. Braumandl, M.Keidl, A. Kemper, D. Kossmann, A.Kreutz, S. Seltzsam and K.Stocker disclose (2001), ObjectGlobe: Ubiquitous query processing on the Internet, pp. 48-71.*
U.S. Appl. No. 10/354,802, "Data Management System that Provides Intelligent Access Plan Caching", Craig S. Aldrich et al., filed Jan. 30, 2003.

* cited by examiner

*Primary Examiner*—Don Wong
*Assistant Examiner*—Merilyn Nguyen
(74) *Attorney, Agent, or Firm*—Owen J. Gamon

(57) ABSTRACT

A method, apparatus and system that in an embodiment detect that a trigger exists, where the trigger indicates a potential need to rebuild a saved query access plan, and determine whether a previous job associated with the trigger created a new access plan that was identical to the saved access plan. If a previous job associated with the trigger has already created the new access plan and found that it was identical to the saved access plan, then the query is performed with the saved access plan, since there is no advantage to be gained by creating the new access plan again. In this way, multiple jobs are kept from repeatedly re-creating an access plan that is identical to one that already exists.

17 Claims, 5 Drawing Sheets

| | | RANGE | | COUNT OF | ARRAY OF POINTERS | | |
|---|---|---|---|---|---|---|---|
| PTF IND | PTF ID | LOW | HIGH | CURRENT INDEXES | TO NEW INDEXES | | |
| OFF | 14789 | 10000 | 15000 | 25 | 123456 | 246810 | 375911 |

150 — CONDITION
205, 206, 210, 215, 220

FIG. 2

QUERY ACCESS PLAN REBUILDS

FIELD

This invention generally relates to computer data management systems and more specifically relates to determining when to rebuild a query access plan.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Fundamentally, computer systems are used for the storage, manipulation, and analysis of data, which may be anything from complicated financial information to simple baking recipes. It is no surprise, then, that the overall value or worth of a computer system depends largely upon how well the computer system stores, manipulates, and analyzes data. One mechanism for managing data is called a Data Management System (DMS), which may also be called a database system or simply a database.

At the most basic level, a database stores data as series of logical tables. Each table is made up of rows and columns. Each table has a unique name within the database and each column has a unique name within the particular table. Different statements called queries allow the user or an application program to obtain data from the database. As one might imagine, queries range from being very simple to very complex. When a database receives a query, the database interprets the query and determines what internal steps are necessary to satisfy the query. These internal steps may include identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as an execution plan or an access plan. The access plan is typically created by a software component that is often called a query optimizer. When a query optimizer creates an access plan for a given query, the access plan is often saved by the data management system in the program object, e.g., the application program, that requested the query. The access plan may also be saved in an SQL (Structured Query Language) package or an access plan cache. Then, when the user or program object repeats the query, the database can reutilize the saved access plan instead of undergoing the expensive and time-consuming process of recreating it.

Despite the existence of a saved access plan in the program object, some triggers, events, or conditions may cause the query optimizer to rebuild the access plan. Often the rebuilt access plan turns out to be the same as the saved access plan, so the rebuilding process was actually unnecessary. Unfortunately, no way exists to determine prior to the rebuilding that the resultant rebuilt access plan will turn out to be identical to the saved access plan.

The problem with the rebuilding turning out to be unnecessary is exacerbated when multiple jobs call the same program object at about the same time, and each is trying to update its access plan. For example, suppose that one job detects a trigger that causes it to rebuild the saved access plan, but then the other jobs see the same trigger, which causes all the jobs to rebuild the saved access plan. But none of the jobs can save their rebuilt access plan back into the program object because all the other jobs hold read locks on the saved access plan, and they all need an exclusive lock to update the saved access plan. Thus, the end result is that all jobs may continue to rebuild the access plan for some time since none of them can save the rebuilt access plan back into the program object due to contention, yet as previously stated, the rebuilding is often unnecessary, so all of the jobs are rebuilding the access plan in vain.

Without a better way to handle rebuilding access plans, computers will continue to suffer from performance problems caused by unnecessary rebuilding.

SUMMARY

A method, apparatus, and system are provided that in an embodiment detect that a trigger exists, where the trigger indicates a potential need to rebuild a saved access plan, and determine whether a previous job associated with the trigger created a new access plan that was identical to the saved access plan. If a previous job associated with the trigger has already created the new access plan and found that it was identical to the saved access plan, then the query is performed with the saved access plan, since there is no advantage to be gained by creating a new access plan again. In this way, multiple jobs are kept from repeatedly re-creating an access plan that is identical to one that already exists.

BRIEF DESCRIPTION OF THE DRAWING

FIG. 2 depicts a block diagram of an example data structure for a condition, according to an embodiment of the invention.

DETAILED DESCRIPTION

Figure 1:
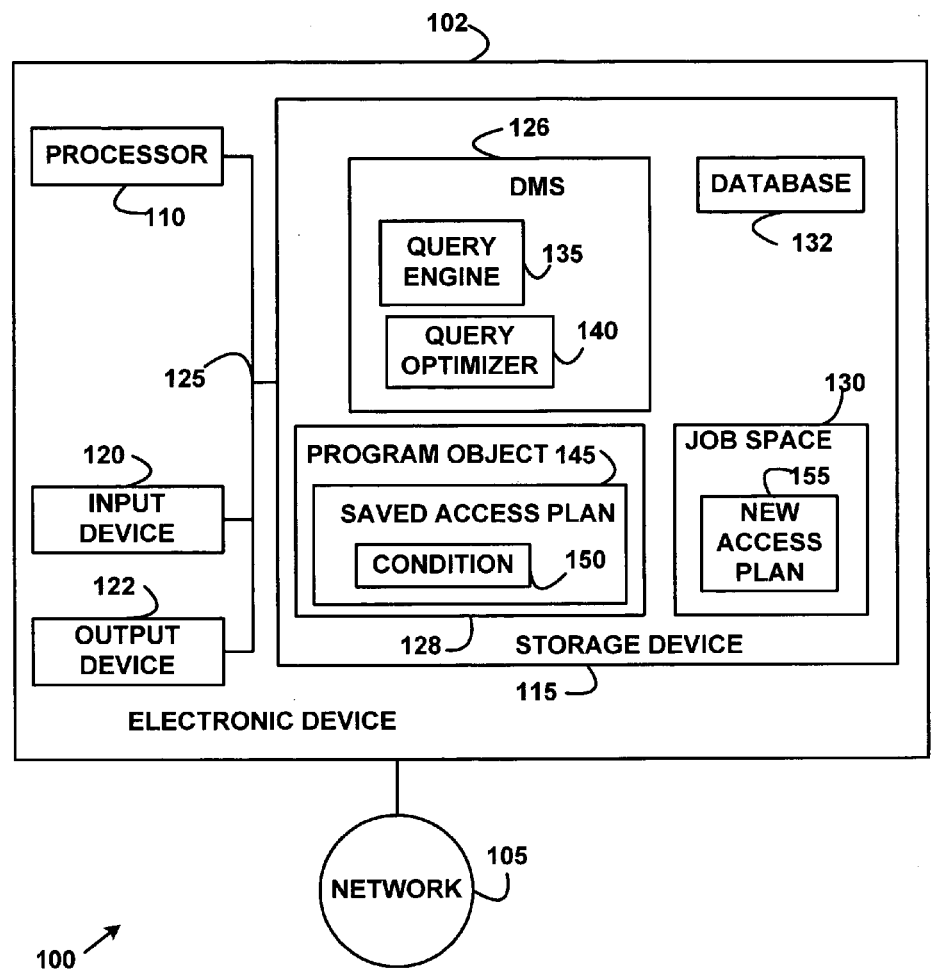
FIG. 1 depicts a high-level block diagram of an example system for implementing an embodiment of the invention.

Referring to the Drawing, wherein like numbers denote like parts throughout the several views, FIG. 1 depicts a high-level block diagram of an example system 100 for implementing an embodiment of the invention. The system 100 includes an electronic device 102 connected to a network 105. Any number of electronic devices and networks may be present, and in another embodiment the network 105 is optional, not present, or not used.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122. Although the electronic device 102 is drawn to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Although the storage device 115 is shown in FIG. 1 as a single monolithic entity, the storage device 115 may in fact be distributed and/or hierarchical, as is known in the art. For example, the storage device 115 may exist in multiple levels of storage devices, and these levels of storage devices may be further divided by function, so that one level of storage device holds, e.g., instructions while another holds, e.g., non-instruction data which is used by the processor or processors. The storage device 115 may further be distributed and associated with different processors or sets of processors, as is known in any of various so-called non-uniform memory access (NUMA) computer architectures. Further, although the electronic device 102 is drawn to contain the storage device 115, it may be distributed across other electronic devices, such as electronic devices connected to the network 105.

The storage device 115 includes a DMS (Data Management System) 126, a program object 128, a job space 130, and a database 132, all of which may in various embodiments exist in any number. Although the Data Management System 126, the program object 128, the job space 130, and the database 132 are all illustrated as being contained within the storage device 115 in the electronic device 102, in other embodiments some or all of them may be on different electronic devices and may be accessed remotely, e.g., via the network 105.

The Data Management System 126 includes a query engine 135 and a query optimizer 140. The query engine 135 performs a query against the database 132 using a query access plan that the query optimizer 140 creates. In an embodiment, the query optimizer 140 includes instructions capable of executing on the processor 110 or statements capable of being interpreted by instructions executing on the processor 110 to perform the functions as further described below with reference to FIGS. 3, 4, and 5. In another embodiment, the query optimizer 140 may be implemented in hardware via logic gates and/or other appropriate hardware techniques in lieu of or in addition to a processor-based system.

The program object 128 includes a saved access plan 145, which includes a condition 150. The saved access plan 145 is created by the query optimizer 140. The condition 150 includes an indication of a condition or conditions that may cause the query optimizer 140 to rebuild the saved access plan 145 and whether any previous rebuilding in response to the condition caused the saved access plan 145 to change. Thus, by checking the condition 150, the query optimizer 140 can determine that a condition has already occurred and that a previous rebuild did not change the access plan, so another rebuild is unnecessary. The condition 150 is further described below with reference to FIG. 2. Although FIG. 1 illustrates the saved access plan 145 as being included in the program object 128, in another embodiment, the saved access plan 145 may be included in a SQL package or an access plan cache.

The program object 128 maybe executed in the job space 130, and the job space 130 may in some embodiments include a new access plan 155, which the query optimizer 140 selectively creates based on the status of the condition 150 in the saved access plan 145, as further described below with reference to FIGS. 3, 4, and 5.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number (including zero) and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number (including zero) of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller). Although the bus 125 is shown in FIG. 1 as a relatively simple, single bus structure providing a direct communication path among the processor 110, the storage device 115, the input device 120, and the output device 122, in other embodiments the bus 125 may comprise multiple different buses or communication paths, which may be arranged in any of various forms, such as point-to-point links in hierarchical, star or web configurations, multiple hierarchical buses, or parallel and redundant paths. Furthermore, while the bus 125 is shown directly connected to the processor 110, the storage device 115, the input device 120, and the output device 122, in other embodiments, some or all of the devices may be connected via I/O(Input/Output) processors.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device 102 to perform the steps necessary to execute steps or elements embodying the various aspects of an embodiment of the invention.

Moreover, while embodiments of the invention have and hereinafter will be described in the context of filly functioning electronic devices, the various embodiments of the invention are capable of being distributed as a program product in a variety of forms, and the invention applies equally regardless of the particular type of computer-readable storage medium used to actually carry out the distribution. The programs defining the functions of this embodiment may be delivered to the electronic device 102 via a variety of computer-readable storage media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such computer-readable storage media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example data structure for the condition 150, according to an embodiment of the invention. The condition 150 includes a PTF (Program Temporary Fix) indicator 205, a PTF identifier 206, a range 210, a count of current indexes 215, and an array of pointers to new indexes 220. Any number of PTF indicators 205 and PTF identifiers 206 may exist, such as an array in the access plan for multiple PTFs.

The PTF indicator 205 indicates whether a new version of the data management system 126 or of a portion of the data management system 126 exists that impacts the saved access plan 145, i.e., that causes a change in the saved access plan 145 when rebuilt. The code contained in the new version of the data management system 126 or the portion thereof is identified by the PTF identifier 206. The PTF indicator 205 and the PTF identifier 206 may have any number of associated corresponding entries. Although PTF (Program Temporary Fix) is shown in FIG. 2, in other embodiments, the new version or the new portion of the data management system 126 may have been changed for any reason, whether to fix a problem, provide new function, or any combination thereof.

When the code identified by the PTF identifier 206 is applied to the data management system 126, the query optimizer 140 determines if the new version may apply to the query for which the saved access plan 145 was built. If so, the query optimizer 140 rebuilds the access plan on the chance that the new version of the data management system 126 will fix a problem in the saved access plan 145 or otherwise improve the saved access plan 145. Once the query optimizer 140 rebuilds the access plan and determines that the new access plan 155 is identical to the saved access plan 145, the query optimizer 140 updates the PTF indicator 205 to indicate that this particular new version of the data management system 126 identified by the corresponding PTF identifier 206 does not make a difference to the access plan. Thus, in an embodiment the condition 150 may include multiple PTF indicators 205, one for each change or new version that has been applied to the electronic device 102. At a future time when the same query is re-executed by a future job, the query optimizer 140 will check the PTF indicator 205 and determine that this particular version change (identified by the corresponding PTF identifier 206) does not impact the access plan, so there is no reason to rebuild it again.

Furthermore, if multiple jobs run the same program object 128 with the same query with the same access plan 145 at the same time, and the first job to complete the query determines that the new access plan 155 is the same as the saved access plan 145 and sets the PTF indicator 205 to indicate so, then when subsequent jobs perform the query, they will check the PTF indicator 205, see that a previous job associated with the trigger has already determined that rebuilding the access plan is unnecessary and refrain from also rebuilding the access plan. Thus, when contending jobs are using the same saved access plan 145, additional rebuilds and compares are obviated, contentions and lockouts are eliminated, and performance is improved. The setting and use of the PTF indicator 205 is further described below with reference to FIG. 3.

The range 210 indicates a range of sizes for a file or table in the database 132, which is accessed by the saved access plan 145 for which the saved access plan 145 does not need to be rebuilt. For example, if a file has grown or shrunk by greater than a threshold percentage since the saved access plan 145 was built, the query optimizer 140 may wish to consider rebuilding the access plan on the chance that a different access plan will perform better. But, if another job has already detected the change in the file size, rebuilt the saved access plan 145 as the new access plan 155, and determined that the new access plan 155 is identical to the saved access plan 145, then no purpose is served by subsequent jobs performing the same rebuild and making the same determination. Hence, when the query optimizer 140 discovers that the access plans are identical, the query optimizer 140 updates the range 210 to include the current size of the file or table in the database 132 to which the query is directed, so that subsequent jobs will know by checking the range 210 whether the current size of the database 132 warrants a rebuild of the saved access plan 145. The use of the range 210 is further described below with reference to FIG. 4.

The count of current indexes 215 indicates the number of indexes in the database 132 that are associated with tables in the database 132 accessed by the saved access plan 145. The array of pointers to new indexes 220 includes pointers to the indexes in the database 132 that are associated with the saved access plan 145. If a new index is built over one of the files or tables in the database 132 that is associated with the saved access plan 145, the number of indexes and/or their location will change, which is how the query optimizer 140 detects that a new index has been built. Thus, if the count 215 or the array of pointers 220 are different from their respective values in the database 132, the query optimizer 140 builds the new access plan 155 on the chance that the new access plan 155 will improve performance over the saved access plan 145. But, if new access plan 155 is identical to the saved access plan 145, the query optimizer 140 updates the counter 215 and the array of pointers 220, so that subsequent jobs will not once again perform the rebuilding process and the comparing. The use of the count of current indexes 215 and the array of pointers to new indexes 220 is further described below with reference to FIG. 5.

The PTF indicator 205, the PTF identifier 206, the range 210, the count of current indexes 215, and the array of pointers to new indexes 220 are only examples of conditions that impact whether the saved access plan 145 needs to be rebuilt, and in other embodiments any appropriate condition may be used. For example, other conditions may be if change occurs in a file used to force different internal implementations of the data management system 126, if a job environment change occurs, such as a change to the default date/timestamp format or SORTSEQ (Sorted Sequence)/CCSID (Coded Character Set Identifier), if the support for or degree of parallelism has changed, if the amount of memory available to the job changes dramatically, if a substantial change in the estimated number of records in the database 132 occurs, or on the first run after a compile of a query.

Figure 3:
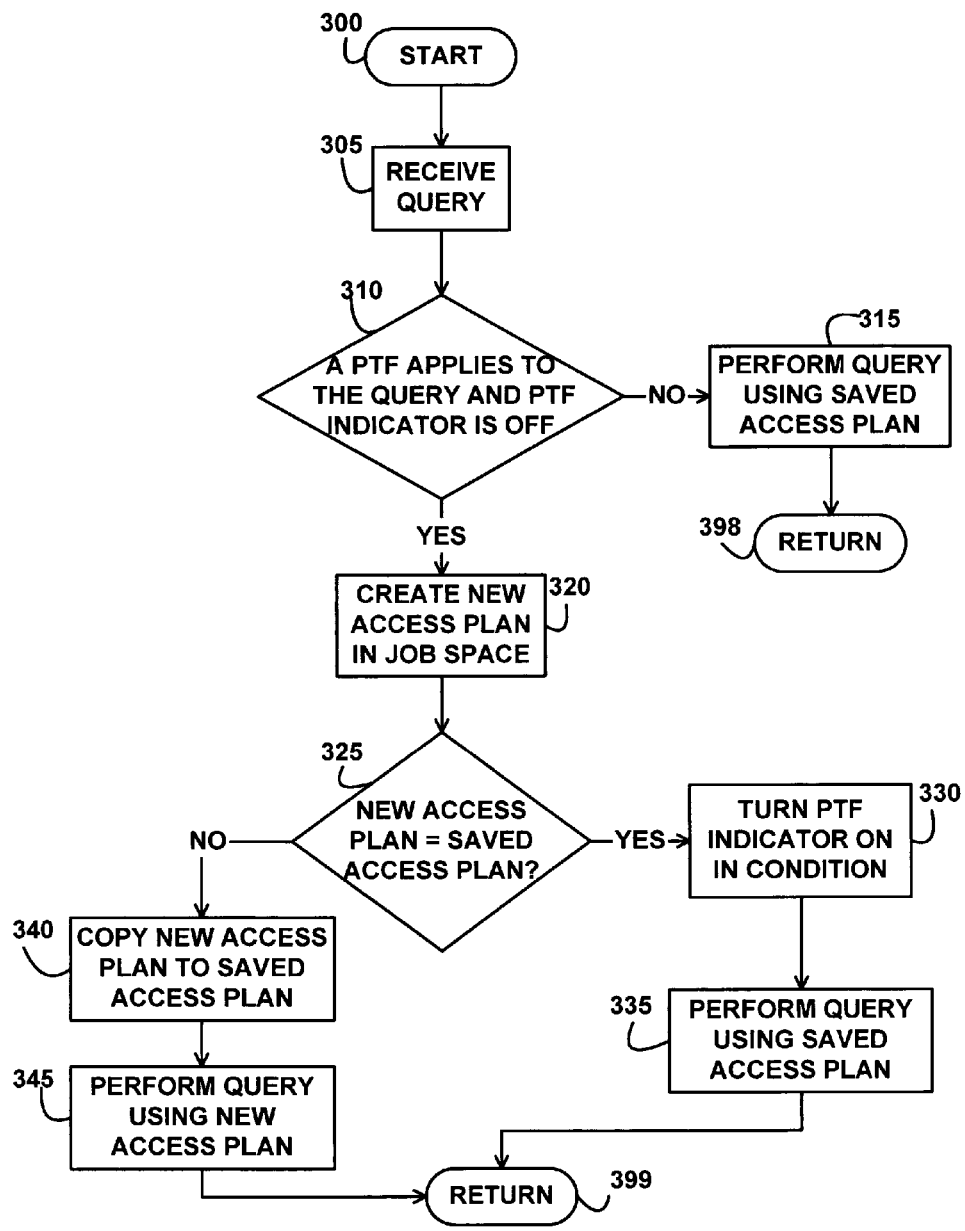
FIG. 3 depicts a flowchart of example processing for handling a condition related to a data management system code change, according to an embodiment of the invention.

FIG. 3 depicts a flowchart of example processing for handling a condition related to a code change in the data management system 126, according to an embodiment of the invention. Control begins at block 300. Control then continues to block 305 where the query optimizer 140 receives a query. Control then continues to block 310 where the query optimizer 140 determines whether a PTF applies to the query (by determining whether a PTF identifier 206 exists in the condition 150 that is associated with the data management system 126) and the corresponding PTF indicator 205 in the condition 150 is off. Finding a PTF that applies to the query is a trigger that indicates a potential need to rebuild the saved access plan 145 associated with the query previously received at block 305.

If the determination at block 310 is false, then control continues to block 315 where the query engine 135 performs the query using the saved access plan 145. Control then continues to block 398 where the logic of FIG. 3 returns.

If the determination at block 310 is true, then the PTF applies to the query and the associated PTF indicator 205 is off, so control continues to block 320 where the query optimizer 140 creates the new access plan 155 in the job space 130. Control then continues to block 325 where the query optimizer 140 determines whether the new access plan 155 in the job space 130 is identical to the saved access plan 145 in the program object 128.

If the determination at block 325 is true, then the new access plan 155 is identical to the saved access plan 145, so control continues to block 330 where the query optimizer 140 turns the PTF indicator 205 on in the condition 150 of the saved access plan 145 in the program object 128. The PTF indicator 205 with a value of "on" indicates that the new access plan 155 that was created in response to the new code for the data management system 126 identified by the PTF identifier 206 resulted in an identical new access plan 155, so there is no reason to create a new access plan in the future.

Control then continues to block 335 where the query engine 135 performs the query using the saved access plan 145. Control then continues to block 399 where the logic of FIG. 3 returns.

If the determination at block 325 is false, then the new access plan 155 is different from the saved access plan 145, so control continues to block 340 where the query optimizer 140 copies the new access plan 155 in the job space 130 to the saved access plan 145 in the program object 128. Control then continues to block 345 where the query engine 135 performs the query using the new access plan 155. Control then continues to block 399 where the logic of FIG. 3 returns.

Figure 4:
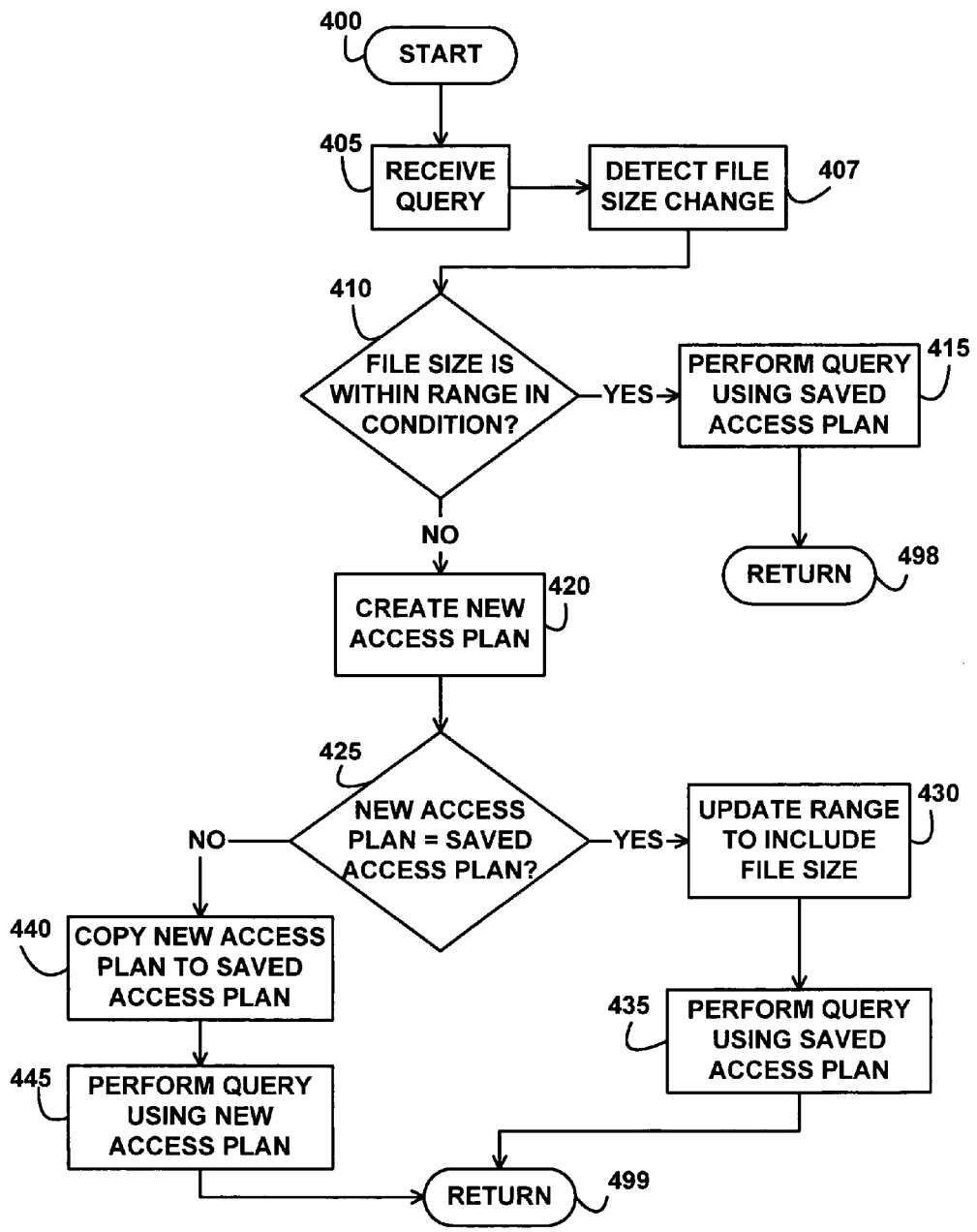
FIG. 4 depicts a flowchart of example processing for handling a condition related to a file size change, according to an embodiment of the invention.

FIG. 4 depicts a flowchart of example processing for handling a condition related to a file size change, according to an embodiment of the invention. Control begins at block 400. Control then continues to block 405 where the query optimizer 140 receives a query. Control then continues to block 407 where the query optimizer 140 detects that the size of the file or table in the database 132 has changed, which is a trigger that indicates a potential need to rebuild the saved access plan 145 associated with the query previously received at block 405. Control then continues to block 410 where the query optimizer 140 determines whether the size of the file or table in the database 132 that is associated with the query is within the range 210 specified by the condition 150. If the determination at block 410 is true, then the file or table size of the database 132 is within the range 210, so control continues to block 415 where the query engine 135 performs the query using the saved access plan 145 since there is no reason to create a new access plan. Control then continues to block 498 where the logic of FIG. 4 returns.

If the determination at block 410 is false, then the size of the file or table in the database 132 that is associated with the query is not within the range 210 specified by the condition 150, so control continues to block 420 where the query optimizer 140 creates the new access plan 155 in the job space 130. Control then continues to block 425 where the query optimizer 140 determines whether the new access plan 155 in the job space 130 is identical to the saved access plan 145 in the program object 128.

If the determination at block 425 is true, then the new access plan 155 is identical to the saved access plan 145, so control continues to block 430 where the query optimizer 140 updates the range 210 in the condition 150 to include the new file size. Control then continues to block 435 where the query engine 135 performs the query using the saved access plan 145. Control then continues to block 499 where the logic of FIG. 4 returns.

If the determination at block 425 is false, then the new access plan 155 is different from the saved access plan 145, so control continues to block 440 where the query optimizer 140 copies the new access plan 155 in the job space 130 to the saved access plan 145 in the program object 128. Control then continues to block 445 where the query engine 135 performs the query using the new access plan 155. Control then continues to block 499 where the logic of FIG. 4 returns.

Figure 5:
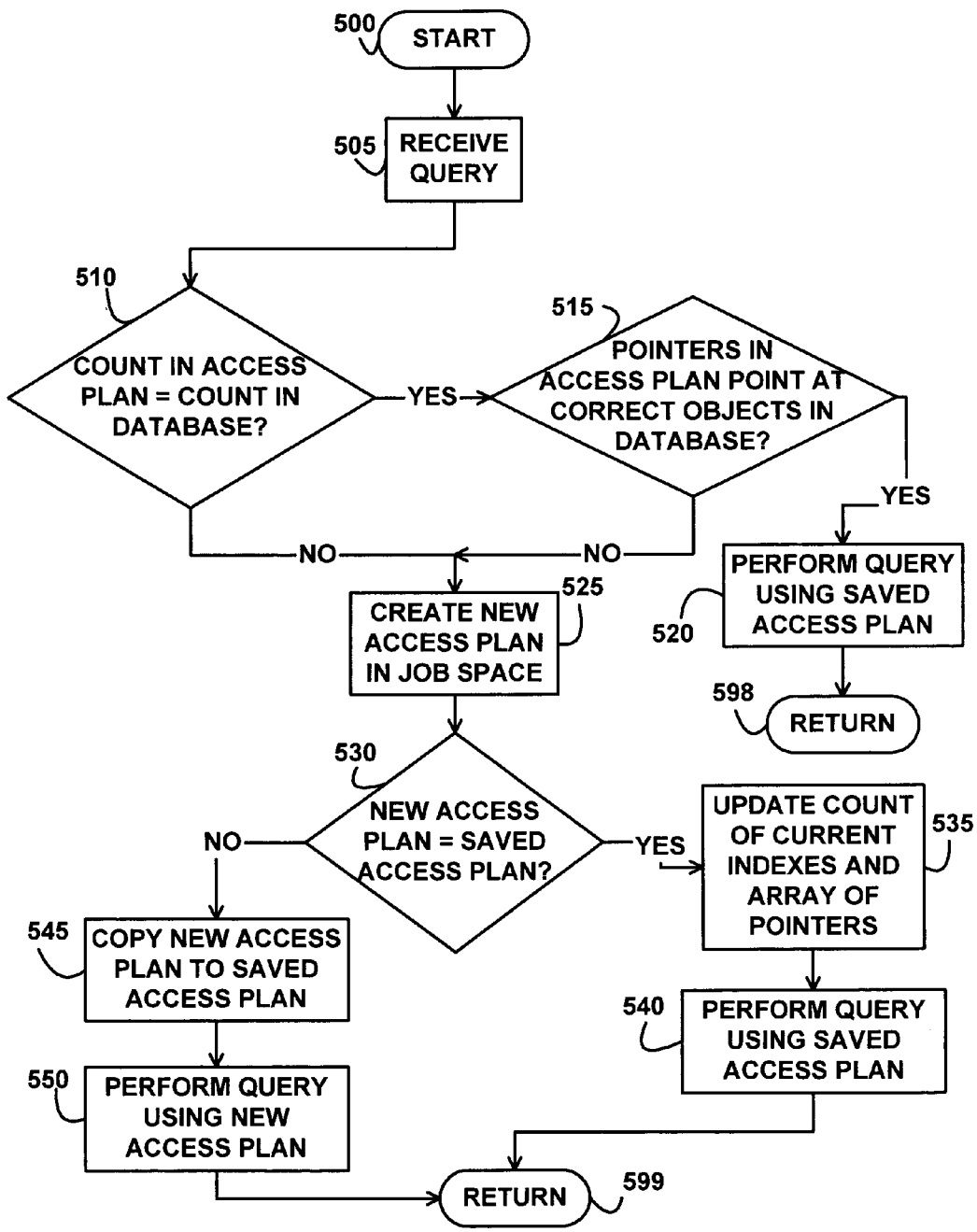
FIG. 5 depicts a flowchart of example processing for handling a condition related to a new index, according to an embodiment of the invention.

FIG. 5 depicts a flowchart of example processing for handling a condition related to a new index in the database 132, according to an embodiment of the invention. Control begins at block 500. Control then continues to block 505 where the query optimizer 140 receives a query. Control then continues to block 510 where the query optimizer 140 determines whether the count of current indexes 215 in the condition 150 in the saved access plan 145 is identical to the count of current indexes in the database 132.

If the determination at block 510 is true, then the count of current indexes 215 in the condition 150 in the saved access plan 145 is identical to the count of current indexes in the database 132, so control continues to block 515 where the query optimizer 140 determines whether the pointers 220 in the condition 150 in the saved access plan 145 point at the correct objects in the database 132. If the determination at block 515 is true, then the pointers 220 in the condition 150 in the saved access plan 145 point at the correct objects in the database 132, so control continues to block 520 where the query engine 135 performs the query using the saved access plan 145. Control then continues to block 598 where the logic of FIG. 5 returns.

If the determination at block 515 is false, then the pointers 220 in the condition 150 in the saved access plan 145 do not point at the correct objects in the database 132, which is a trigger that indicates a potential need to rebuild the saved access plan 145 associated with the query previously received at block 505, so control continues to block 525 where the query optimizer 140 creates the new access plan 155 in the job space 130. Control then continues to block 530 where the query optimizer 140 determines whether the new access plan 155 in the job space 130 is identical to the saved access plan 145 in the program object 128.

If the determination at block 530 is true, then the new access plan 155 in the job space 130 is identical to the saved access plan 145 in the program object 128, so control continues to block 535 where the query optimizer 140 updates the count of current indexes 215 and the array of pointers 220. Control then continues to block 540 where the query engine 135 performs the query using the saved access plan 145. Control then continues to block 599 where the logic of FIG. 5 returns.

If the determination at block 530 is false, then the new access plan 155 in the job space 130 is different from the saved access plan 145 in the program object 128, so control continues to block 545 where the query optimizer 140 copies the new access plan 155 in the job space 130 to the saved access plan 145 in the program object 128. Control then continues to block 550 where the query engine 135 performs the query using the new access plan 155. Control then continues to block 599 where the logic of FIG. 5 returns.

If the determination at block 510 is false, then the count of current indexes 215 in the condition 150 in the saved access plan 145 is different from the count of current indexes in the database 132, which is a trigger that indicates a potential need to rebuild the saved access plan 145 associated with the query previously received at block 505, so control continues from block 510 to block 525, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A computer-implemented method comprising:
    detecting that a trigger exists, wherein the trigger indicates a need to rebuild a saved access plan associated with query;
    determining whether a previous job associated with the trigger created an access plan that was identical to the saved access plan;
    if the previous job associated with the trigger did not create the access plan that was identical to the saved access plan, creating a new access plan and comparing the saved access plan with the new access plan; and
    if the comparing determines that the saved access is identical to the new access plan, performing the query via the saved access plan.

2. The method of claim 1, further comprising:
    if the comparing determines that the saved access plan is different from the new access plan, replacing the saved access plan with the new access plan and performing the query with the new access plan.

3. The method of claim 1, further comprising:

if the determining is true, performing the query with the saved access plan.

4. An apparatus comprising:

means for detecting that a trigger exists, wherein the trigger indicates a need to rebuild a saved access plan associated with query;

means for determining whether an access plan was previously created in response to the trigger and the access plan was previously found to be identical to the saved access plan;

means for performing the query with the saved access plan if the determining is true; and means for creating a new access plan and comparing the saved access plan with the new access plan if the determining is false.

5. The apparatus of claim 4, further comprising:

means for performing the query via the saved access plan if the comparing determines that the saved access plan is identical to the new access plan.

6. The apparatus of claim 4, further comprising:

means for replacing the saved access plan with the new access plan and performing the query with the new access plan if the comparing determines that the saved access plan is different from the new access plan.

7. The apparatus of claim 4, wherein the means for determining comprises a condition in a program object associated with the query.

8. A computer-readable storage device encoded with instructions, wherein the instruction when executed comprise:

detecting that a trigger exists, wherein the trigger indicates a need to rebuild a saved access plan associated with query;

determining whether a previous job associated with the trigger created an access plan that was identical to the saved access plan;

performing the query with the saved access plan if the determining is true; and creating a new access plan and comparing the saved access plan with the new access plan if the determining is false.

9. The storage device of claim 8, further comprising:

performing the query via the saved access plan if the comparing determines that the saved access plan is identical to the new access plan.

10. The storage device claim 8, further comprising:

replacing the saved access plan with the new access plan and performing the query with the new access plan if the comparing determines that the saved access plan is different from the new access plan.

11. The storage device of claim 8, wherein the trigger comprises a new version of at least a portion of a data management system.

12. The storage device of claim 8, wherein the trigger comprises a change of a file size in a database to which the query is directed.

13. An electronic device comprising:

a processor; and a computer-readable storage device encoded with instructions, wherein the instructions when executed on the processor comprise:

detecting that a trigger exists, wherein the trigger indicates a need to rebuild a saved access plan associated with query, determining whether a previous job associated with the trigger created an access plan that was identical to the saved access plan, performing the query with the saved access plan if the determining is true, creating a new access plan and comparing the saved access plan with the new access plan if the determining is false, and performing the query via the saved access plan if the comparing determines that the saved access plan is identical to the new access plan.

14. The electronic device of claim 13, wherein the instructions further comprise:

replacing the saved access plan with the new access plan and performing the query with the new access plan if the comparing determines that the saved access plan is different from the new access plan.

15. The electronic device of claim 13, wherein the trigger comprises a new version of at least a portion of a data management system.

16. The electronic device of claim 13, wherein the trigger comprises a change of a file size in a database.

17. The electronic device of claim 13, wherein the trigger comprises a new index in a database.

* * * * *